(12) United States Patent
Kuffel et al.

(10) Patent No.: US 8,022,338 B2
(45) Date of Patent: Sep. 20, 2011

(54) HEATING ELEMENT FOR A FILTER PRESS

(75) Inventors: Lothar Kuffel, Marktoberdorf (DE); Johann Zeller, Oberthingau (DE); Rolf Friedrich Buhl, Cologne (DE)

(73) Assignee: Klinkau GmbH & Co. (DE)

( * ) Notice: Subject to any disclaimer, the term of this patent is extended or adjusted under 35 U.S.C. 154(b) by 1170 days.

(21) Appl. No.: 10/568,036

(22) PCT Filed: Aug. 3, 2004

(86) PCT No.: PCT/EP2004/008693
§ 371 (c)(1), (2), (4) Date: Nov. 8, 2006

(87) PCT Pub. No.: WO2005/016487
PCT Pub. Date: Feb. 24, 2005

(65) Prior Publication Data
US 2007/0187312 A1 Aug. 16, 2007

(30) Foreign Application Priority Data
Aug. 14, 2003 (DE) .................................. 103 37 498

(51) Int. Cl.
*B01D 25/12* (2006.01)
*B01D 25/21* (2006.01)
*B01D 35/18* (2006.01)
(52) U.S. Cl. ......... 219/530; 210/184; 210/231; 210/770
(58) Field of Classification Search .................. None
See application file for complete search history.

(56) References Cited

U.S. PATENT DOCUMENTS

| 4,948,501 A | * | 8/1990 | Klinkau et al. | 210/231 |
| 5,792,348 A | * | 8/1998 | Eisinga | 210/231 |
| 6,149,806 A | * | 11/2000 | Baer | 210/231 |
| 6,387,282 B1 | * | 5/2002 | Heckl et al. | 210/770 |

FOREIGN PATENT DOCUMENTS

| DE | 19843028 | | 3/2000 |
| DE | 20006891 U1 | * | 7/2000 |
| EP | 0 676225 | | 10/1995 |
| GB | 346191 | | 4/1931 |

* cited by examiner

*Primary Examiner* — Joseph M Pelham
(74) *Attorney, Agent, or Firm* — Frommer Lawrence & Haug, LLP

(57) ABSTRACT

The invention relates to a heating element for a filter press, that can be supplied with a fluid heating medium and comprises at least one heating plate consisting of a heat-conducting material and extending essentially over a plane. Said heating plate is fixed to a base body of the heating element, exclusively in a continuous partial region, the surface of the continuous partial region being smaller than the remaining surface of the heating plate. The invention also relates to a heating element for a filter press, comprising two heating plates which are interconnected by means of spacers, outside the lateral expansion of the base body. The entire base body can be freely displaced between the heating plates, in relation thereto, at least in such a way that a thermal expansion of the heating plates and a different thermal expansion of the base body can take place.

15 Claims, 3 Drawing Sheets

HEATING ELEMENT FOR A FILTER PRESS

Figure 1:
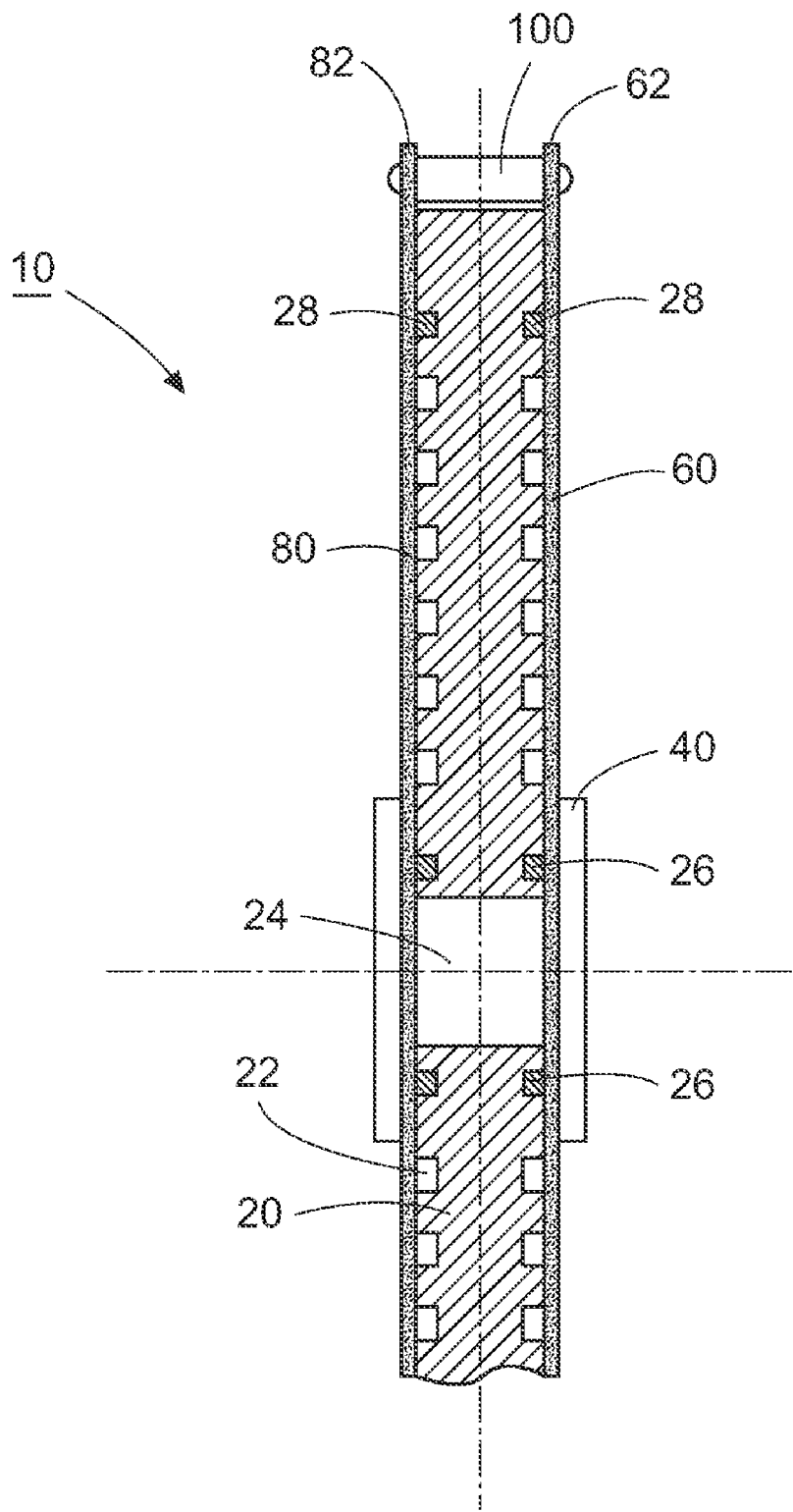

The present invention concerns a heating element for a filter press, which can be provided with a fluid heating medium and has at least one heating plate made of a heat-conducting material.

Filter presses are known in many forms, and as a rule multiple membrane filter plates are assembled together in a single filter press such that between the individual membrane filter plates a filter chamber is formed. Usually a suspension is pressed into the filter chamber via an intake and/or outflow area and filtered by means of a filter cloth placed upon the membrane, whereby the solids are retained in the filter chamber by the filter cloth such that a so-called filter cake is formed. The filtrate from which the solids have been removed is then led out of the system. The membranes can then be subjected to pressure, for example, so that they extend from an edge of the filter chamber into the filter chamber and onto each other such that the filter cake is pressed together and thus the moisture is removed. At this point it should be pointed out that filter presses can be manufactured in various forms and with diverse variables.

Filter presses with heating elements are further known in which the heating elements are preferably assembled between the individual membrane filter plates in the filter press such that customarily the heating elements alternate with the membrane filter plates. Such heating elements are especially useful in thermal drying of the filtered solids and/or the filter cake.

Such a heating element for a filter press is for example known from the German utility patent set forth in DE 20 06 891 U1. The heating elements revealed in this publication comprise a base with a metal plate affixed to each side such that they are sealed and such that branching parallel heating medium canals are formed.

It is problematic in such heating elements however to assure, for example, a secure attachment of the heating plate to the base which in turn assures the seal of the heating medium canals during operation. The sealing elements lie between heating plate and base within the filter chamber with the suspension, whereby a constant impact of dirt particles upon the sealing elements occurs which in conjunction with the thermally-induced relative displacements at the edge area strongly compromises the lifetime of the sealing elements. Further, the fasteners themselves, such as the screws and anti-fatigue sleeves between the heating plates, are subject to constant thermal alternation which in the long run can lead to malfunctions.

It is thus the task of the current invention to present a heating element for a filter press which offers secure attachment of the heating element to the base, is simple and economical to manufacture, is securely sealed during operation of the heating plate, and offers improved drying results.

This task is accomplished by a heating element according to Claim 1 as well as a heating element according to Claim 11; Claims 2 through 10 and 12 through 15 concern particularly advantageous embodiments of a heating element according to the invention.

According to the invention, the heating element for a filter press which can be used with a fluid heating medium has at least one heating plate made from a heat-conducting material. The heating plate is a plate which essentially extends over a given plane and is attachable to one side of a base of the heating element.

According to the invention, the minimally one heating plate is further attached in a continuous partial area to the base, whereby the surface of the continuous partial area is smaller than the remaining surface of the heating plate external to this continuous partial area. The minimally one heating plate is thus in extensive areas, at least also in one, multiple or even all external areas of the plane not joined to the base. In contrast to the heating plates according to the current state of the art, which are attached to the base on their entire perimeter, there is thus for a heating plate according to the invention the possibility to thermally expand quite independently of the base and/or to react to other forces or pressure without warping between the base and the heating plate.

Since especially the materials for the base on the one hand and the heating plate on the other as a rule have clearly different characteristics, especially in that they consist of materials with clearly different heat expansion coefficients, the problems present in the current state of the art, which occur with normal of such a filter press in a wide range of temperatures, as a rule between 20 and 150 degrees Celsius, namely warping between the two connected materials on the basis of the varying heat expansion, are avoided, so that straining and destruction of the materials, and also possible malfunctions, for example due to mutual warping or loosening warping of the fasteners, leakages can be simply and effectively avoided.

In the heating element according to the invention, the heating plate and the base can to a large extent expand independently of each other, whereby relative distortions of the elements occur, whereby however the leak tightness of the heating element and of the heat medium canals is especially assured by means of a firm attachment of the heating plate to the base, which during operation especially is assured by the pressing together in the filter press. Screw connections in areas of these unavoidable thermally-induced relative distortions between the heating plate and the base are especially to be avoided.

At this point it should be noted that with the customary materials and in the relevant temperature ranges heat expansion differences are present in both the heating plate and the base which can be in the range of 2-3 percent of the length of the overall material, so that in customary heating elements with a side length of ca. 1500 mm. expansion differences of up to 45 mm must be compensated, straining or destroying rigid attachments and leading to the fact that a plate between two fastener elements bulges due to these tensions, which can lead to leakages or in the event of floating fasteners, for example screws which move in slots distributed around the perimeter of the base and are subject to alternating thermal alternating strains, which in the long run can cause the fasteners to loosen and thus also lead to leakages, whereby moreover functional disturbances can occur if for example the movement of the fasteners in the slots or another floating suspension does not function reliably.

In an especially preferred embodiment the continuous partial area evidences an expansion which at least in one of two directions perpendicular to each other and mounting [aufspannen] the plane, does not exceed 50% of the maximal expansion of the heating plate in this direction.

It is especially preferred that the continuous partial area, in which the heating plate is fastened to the base plate, extends at least in a linear direction of the plane over which the heating plate extends, over maximally 50 percent of the dimension of the plane in this direction. It is however also possible for the fasteners to extend in one direction essentially over the entire expansion of the heating plate and/or the base reaches, however in a second direction, which has at least one component perpendicular to the first direction, extend only over a limited area. Preferably the area, in which the heating plate is attached to the base, reaches in two directions perpendicular to each other, which mount [aufspannen] the plane, over maximally 50 or 40 percent of the dimension of the heating plate or the base in the respective direction, whereby it is especially preferred that the area does not exceed 30 percent of the dimensions or even 20 percent of the dimensions in this or in both directions.

In particular the continuous partial area in which the heating plate is fastened to the base plate extends however at least over a surface, which corresponds to the surface expansion of a suspension inlet or of a support pin.

By "fastener" in the sense of the invention an apparatus is to be understood which is positioned in such a manner that it hinders a relative movement between at the minimally one heating plate and the base especially in directions parallel to the mounted [aufgespannten] plane.

The heating element according to the invention assures that the heating plate and the base are free to expand independently of each other over a wider partial area. The smaller the areas are in which the heating plate is attached, the larger the degree of freedom of the independent expansions of the individual elements.

In a particularly preferred embodiment, the heating element has a central borehole whereby the heating plate and the base are provided with such a central borehole. In this preferred embodiment the heating plate is attached to the base preferably in an area around this central borehole, while in the external area the heating plate is not firmly attached to the base so that an expansion of the heating plate in the area outside the central borehole and thus essentially over the entire upper surface of the heating plate is possible independent of the base.

The heating plate can be attached in various ways to the base, for example by means of screw attachments, possibly however also by means of a type of bayonet mount or also by a flange element connecting the plate firmly with the base in the area of the central borehole.

A special achievement of such an embodiment makes it possible that the edge areas of the base require no fastening devices such as slots, etc., which means that structures and heating canals can be formed in the base, possibly in conjunction with the respective heating plate, and the sealing elements which border the heating area at the seal edge, can be formed further in the edge areas. Thus a larger surface for the heating medium is available, and the filter cake can be heated reliably and thus dried in the edge areas also, which in devices according to the state of the art with their slots in the edge areas cannot be assured.

In one embodiment the heating plate lies next to this central fastener on the base only loosely, whereby the seal of the heating medium canals formed by the base plate and/or the heating plate in the interior of the heating element can be achieved by the pressure exerted by the filter press on the heating element during operation.

It is possible that the heating plate and the base, in the areas in which they are not connected with each other, are so formed that they seal directly against each other; it is however also possible to provide additional sealing elements which strengthen or make possible a sealing of the heating plate against the base especially in the area of the heating medium canals. Obviously it is also possible to provide for a direct seal of the two materials against each other where the heating plate is fastened to the base or to provide for additional seals in the area of the attachment of the heating plate to the base.

In another embodiment the heating element evidences a borehole in a corner area whereby the heating plate is attached to the base only in the area of this borehole, analogous to the above explanations. The advantages are comparable to those in the case of the central borehole; only the positioning of the conduit or borehole is different.

In yet another embodiment it is also possible to connect the heating element to the base by extending a side area, whereby it is clearly possible to lead the connection over the entire expansion of the side area; but it is preferable, as indicated above, to provide a connection over just a small area, maximally 30 percent or even 20 percent of the length expansion. The connection over only one area with a surface smaller than the surface of the area of the heating plate is preferred, to which no attachment is planned.

Especially in the case of an attachment in the edge area but also in attachments near the conduits, for example near the central borehole, fasteners can also be provided by means of brackets or clamps, which assure a firm attachment and connection of the heating plate to the base.

Preferably the heating plate consists of only one metal, especially aluminum, stainless steel or even titanium, or of a heat-conducting synthetic or of a combination of such materials, while the base preferably is made of a single synthetic material, especially of polypropylene PP. The metal heating plate evidences thus an especially high heat conductivity, which is significant for the heating effect, while the synthetic base is especially simple and cost-effective to produce. It should be noted at this point that especially in the choice of these elements the heat expansion coefficients vary greatly so that the invention in the use of especially these materials is significant.

In one embodiment, the heating plate can extend in the direction of its plane essentially within the respective dimension of the base; it is however also possible that the heating plate extends in one or multiple directions beyond the lateral dimension of the base. It is also possible that the lateral dimensions, at a certain temperature, essentially align with each other, whereby the heating plate extends out beyond the lateral dimensions of the base only during normal use and according to temperature and on the basis of the different expansion coefficients, but on the other hand may lie within the side dimensions of the base.

In one preferred embodiment the heating element comprises two heating plates, each located on a side of the base. It is however also possible that the heating element comprises only a single heating plate, especially no filter chamber is present on the other side or this filter chamber is not to be heated.

In a particular embodiment the two heating plates extend above the base at least on one side, whereby further at least one fastener element holding the two heating plates in a fixed position relative to each other. These fastener elements can be, for example, spacers which connect the two heating plates with each other. Given the same or at least very similar heating expansion coefficients of the two heating plates, in contrast to an attachment of the heating plate to the base the afore-mentioned problems do not arise. Given essentially the same expansion or comparable heat expansion coefficients and comparable heat behavior of the two heating plates, the fastener element moves rather in conjunction with the two heating plates or the areas of the heating plate relative to the base.

At this point it should be noted that in one embodiment in which two heating plates of preferably identical material are present, it is nonetheless also possible in certain forms of the invention to use different materials whereby these as a rule evidence at least similar heat expansion coefficients.

According to a second aspect of the invention a heating element for a filter press is intended which can be supplied with a fluid heating medium, with a base and two heating plates which essentially extend over a plane made of a heat-conducting material. In this heating element, the base is arranged between the heating plates whereby the heating plates are connected to each other by means of spacers external to the lateral expansion of the base, whereby the entire base is freely moveable at least in one degree [in einem Masse] between the heating plates relative to the heating plates, such that that a different, thermally determined expansion of the heating plates on the one hand and of the base on the other is possible in the plane. By means of this arrangement according to the second aspect of the invention a comparable goal is achieved, namely the possibly of relative movement of the heating plates on the one hand and of the base on the other, whereby on the basis of the arrangement of the heating plates and the spacers, the fastener according to the first aspect of the invention, described above, can be done away with, so that the base is completely moveable without any fastening in the sense of the invention between the heating plates in at least one predetermined area.

The task according to the invention is thus fulfilled by means of two alternative but similar designs of the heating element, both of which assure the desired relative mobility of the elements with reference to each other in a particularly reliable manner.

It should be noted at this point that the spacers have preferably at least a minimum length such that a thermally determined expansion of the base especially perpendicular to the plane does not lead to a distortion of the heating plate. However even if the heating plates are bent toward each other at their end areas due to the expansion of the base and the connection of the heating plates, the function of the relative movement of the elements is not disturbed, since no deadlock takes places such as would be the case with elements in the state of the art, whereby leakages are also avoided.

In one of the preferred embodiments of the invention there is moreover a fastening between the base and the heating plates in a very limited continuous portion of the heating element, a portion which for example corresponds to a surface expansion of a suspension intake or of a support pin in the filter plate or at least is smaller than the remaining surface of the freely moveable area, whereby this place forms a fixed point between the heating plate and the base and thus allows the arrangement of the necessary functional and sealing elements in the narrowest area, without requiring free areas for the relative pats between heating plate and base. In this embodiment it is also possible that the heating element surrounds a heating plate only on one side, as discussed above.

In contrast to the heating element according to the state of the art, the heating plates of which are connected to each other in their entire circumference by means of fasteners which must be used to assure the pre-stressing of the seals, the possibility thus exists for a heating element according to the invention to do away with all fastening elements of the heating plates on the circumference and to produce a pre-stressing of the seal required for the sealing of the pressure area thus not by means of multiple screw elements on each heating element but rather by means of the closing power of the filter press from outside on the heating element, which clamp together the entire plate package, with the advantage of a significant increase of the functional security of the seal, drastic reduction of components and of the assembly and production expenses, as well as a greater usable heating surface, since the seals in the edge area between the heating plate and base can be placed more to the outside, close to the outermost edge of the sealing edge.

Moreover in contrast to the state of the art, in which heating plates and bases must have exactly coordinated dimensions and tolerances to assure the necessary component free areas in instances of thermal expansion, in the solution according to the invention in all circumstances a secure functioning of the entire heating element is achieved in that heating plate and base can thermally expand largely independently of each other and can react to other forces or pressures without reference to fasteners which can hinder the deformation.

Especially on the basis of the form of the heating element according to the invention, in which above all no stresses such a described above occur, it is possible the keep the thickness of the heating plate to a relative minimum. Typical thicknesses for heating plates in heating elements according to the invention are less than 4 mm, whereby a thickness of 1 to 2 mm is preferred.

In a preferred embodiment, the metal plates can be provided with structures on the interior, especially with longitudinal grooves, which, possibly in common with the base, form canals on the back or interior side of the heating plate for the distribution of the heating medium, whereby it may be that a corresponding molding of the base can be dispensed with or at least reduced, which leads to an especially simple and cost-effective manufacture of the base.

These and further aspects and advantages of the invention are made clear by the attached schematic drawings which show multiple forms of the invention.

FIG. 1 a partial cross section representation of a first embodiment of a heating element according to the invention with a central borehole.

Figure 2:
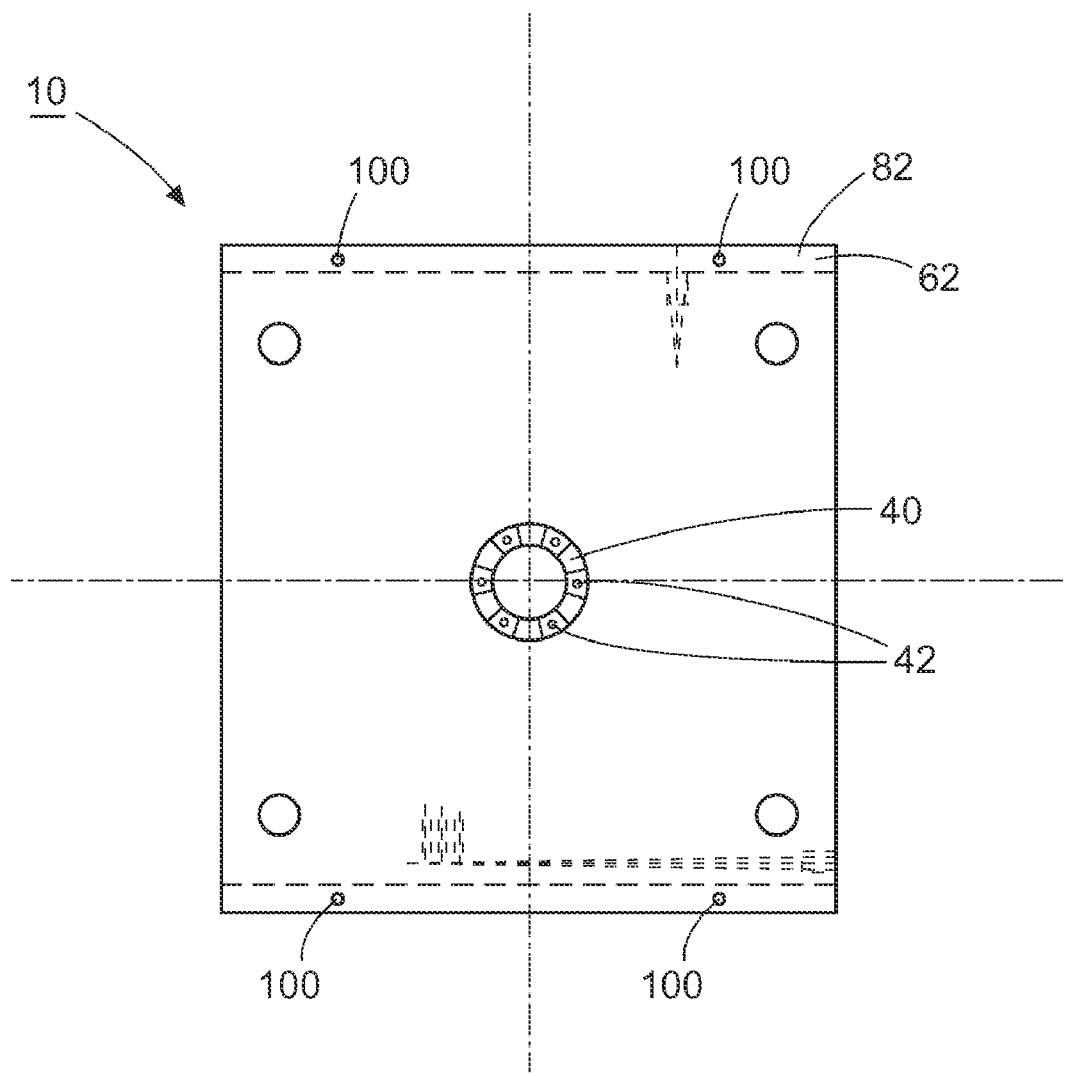

FIG. 2 a top view of the embodiment shown in FIG. 1.

Figure 3:
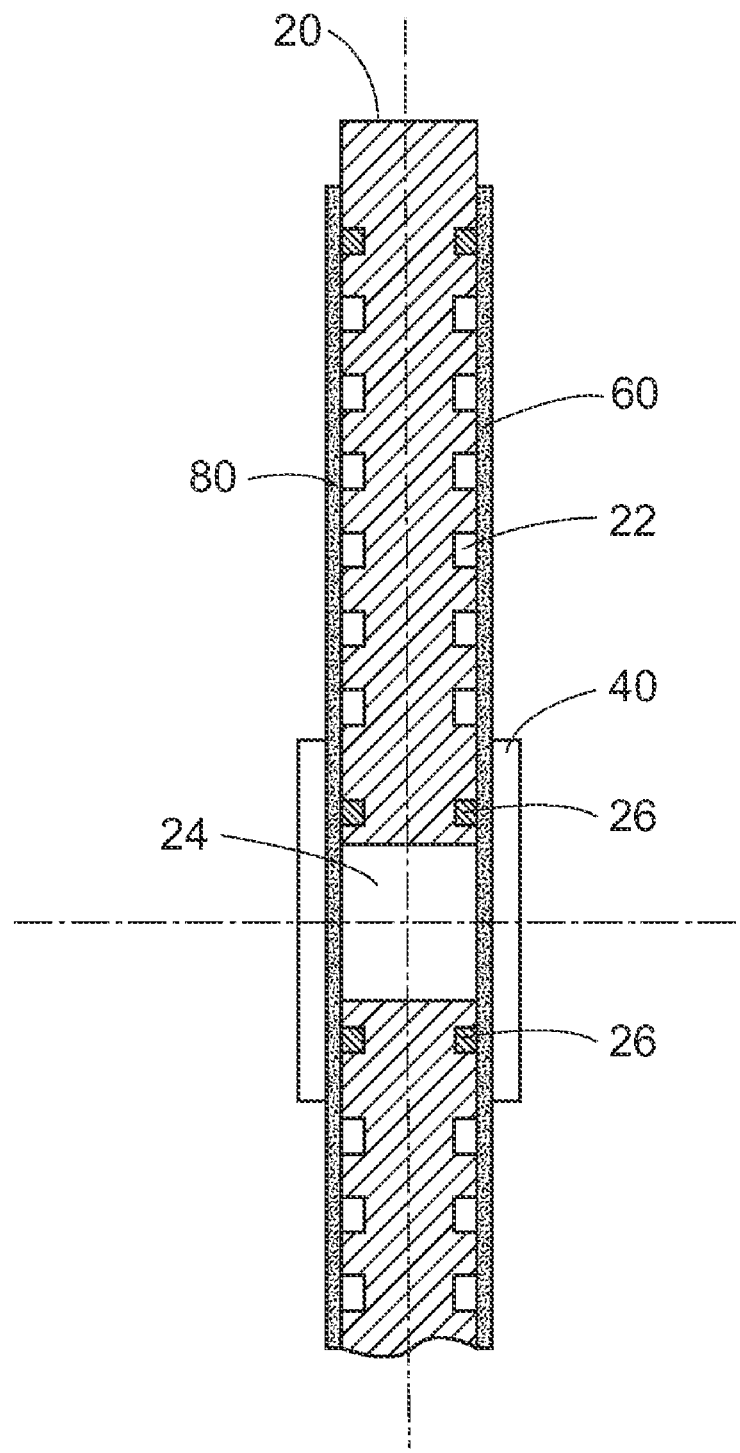

FIG. 3 a partial cross sectional view of a second embodiment of a heating element according to the invention with a central borehole.

FIG. 1 is a schematic partial cross section of a first embodiment of a heating element 10 according to the invention. Heating element 10 comprises a base 20 structured on both upper sides and canals 22 through which a fluid heating medium, especially a heating liquid or steam, can be lead.

On both sides of base 20 there is a heating plate 60 or 80, firmly connected to the base 20 in the area of the central borehole 24 by means of a fastener 40. The central borehole 24 extends through the base 20 as well as through the two heating plates 60 and 80. In this embodiment the two heating plates 60, 80 are not connected to each other via the central borehole 24, but such a connection can be used in another embodiment.

Fastener 40 concerns a central flange used in this embodiment which is attached by means of screw fasteners (not shown) to the base plate (see also FIG. 2) whereby the screw fasteners are led by boreholes in the base 20.

The two heating plates 60 and 80 extend on two sides (see also FIG. 2) beyond the lateral dimensions of the base 20, whereby the areas extending beyond the base are designated as 62 and 82.

In areas 62 and 82 of heating plates 60, 80 a connector element 100 is provided in two places (see also FIG. 2), connecting the two heating plates 60, 80 to each other. In the embodiment shown here, this connector comprises a spacer.

Heating plates 60 and 80 are both essentially flat so that they lie against the respective top of the base 20 and close the heating medium canals 22 to the outside.

Next to the canals 22 are further recesses in the base 20, which serve to accommodate the seals 26, 28 by means of which the heating plates 60, 80 are sealed with reference to the base 20, and by means of which also a self seal of the canals 22 is achieved by the direct placement of the heating plate 60 or 80 on the base 20.

As can be seen from FIG. 1, heating plates 60 and 80 on the one hand and the base 20 on the other hand can move and expand essentially independently of each other, so that for example in a stronger expansion of the heating plates 60 and 80 it is possible for them to expand laterally, together with the fastener 100, to expand further to the outside so that the areas 62 and 82 of heating plates 60, 80 extend laterally farther beyond the base 20 so that the fastener 100 is located a greater distance from the base 20 without incidence of warping, since a fastening of the heating plates 60, 80 is only provided in the area of the central borehole 24.

FIG. 2 shows a top view of the embodiment of the heating element shown in FIG. 1. As FIG. 2 makes clear, the heating element 10 comprises a total of 4 fasteners 100 on two opposing sides in areas 62, 82 of heating plates 60, 80, which extend beyond the lateral dimensions of the base.

As is also clear in FIG. 2, the fastener 40 comprises a total of 6 screw elements 42 in the area of the central borehole, which are led into the base 20 by means of their boreholes into the base 20 and with which the heating plates 60, 80 are fastened to the base 20.

FIG. 3 shows a partial cross section of a further embodiment of a heating element 10 according to the invention. Identical or similar components have been provided with identical references so that reference can be made to the descriptions for the previous figures.

In contrast to the embodiment shown in FIG. 1, the heating plates 60, 80 do not extend over the lateral dimensions of the base 20, but rather end within the lateral dimensions of the base 20.

In this embodiment too the heating plates 60, 80 are firmly attached to the base in the area of a central borehole 24 by means of a flange fastener 40, while the heating plates 60, 80 simply rest loosely on the base in the other areas. In this embodiment also seals 26, 28 are provided, as well as also a direct seal, which is already present due to the contact of the heating plates 60, 80 with the base 20.

In all indicated embodiments the seals at the edge area between heating plates 60, 80 and the base 20 are achieved essentially by means of the clamping force of a press in which the indicated embodiments of the heating elements 10 are inserted, rather than by screws or other fasteners attaching the heating plates in at least one direction to the base.

The base 20 of the embodiment shown in FIG. 1 is made of polypropylene PP, while the heating plates 60, 80 are aluminum plates with a strength of ca. 1.5 mm.

In the embodiment shown in FIG. 3 the heating plates 60, 80 are made of titanium sheeting with a strength of ca. 1 mm.

The characteristics revealed in the present description, claims and drawing can be significant individually or in combination for the realization of the invention in its various forms.

KEY TO THE DRAWINGS

10 Heating element
20 Base
22 Canals
24 Central borehole
26 Seal
28 Seal
40 Fastener
42 Screw elements
44 Clamp elements
60 Heating plate
62 Heating plate areas
80 Heating plate
82 Heating plate areas
100 Connector

The invention claimed is:

1. A heating element for a filter press, the filter press being capable of being supplied with a fluid heating medium and comprising:
    a base; and
    at least one heating plate extending over a plane and made of a heat-conducting material, which is attached to the base;
    wherein each heating plate is attached to the base exclusively by a fastener that comprises a flanged portion that is in contact with the heating plate exclusively in one continuous partial area of the surface of the heating plate, the continuous partial area being smaller than the remaining surface of the heating plate; and
    wherein the continuous partial area is surrounded in the plane by an external area of the at least one heating plate in which the at least one heating plate is not attached to the base.

2. A heating element according to claim 1 wherein the expansion of the continuous partial area at least in one of two directions which span the plane of the heating plate and are perpendicular to each other does not exceed 50% of the maximal expansion of the heating plate in this direction.

3. A heating element according to claim 2 wherein the continuous area in both directions which span the plane of the heating plate and are perpendicular to each other, does not exceed 50% of the maximal expansion of the heating plate in each of the directions.

4. A heating element according to one of the claims 1 to through 3, wherein:
    the heating element has a central borehole; and
    the at least one heating plate is attached to the base only in the continuous partial area, which is located around the central borehole.

5. A heating element according to one of the claims 1 through 3, wherein the heating element has a borehole in a corner area whereby the at least one heating plate is fastened to the base in only the continuous partial area, which is at the corner borehole.

6. A heating element according to one of the claims 1 through 3, wherein the at least one heating plate is attached to the base only substantially on one edge area of the heating plate.

7. A heating element according to one of the claims 1 through 3, wherein the at least one heating plate extends in the direction of its plane only within the lateral dimensions of the base.

8. A heating element according to one of the claims 1 through 3, wherein the at least one heating plate extends beyond the base in the direction of its plane at least on one side.

9. A heating element according to one of the claims 1 through 3, wherein the heating element comprises two heating plates.

10. A heating element according to claim 9, wherein at least one connector is provided to hold the two heating plates in a fixed position relative to each other.

11. A heating element for a filter press according to one of claims 1 through 3, comprising:
    two heating plates of a heat-conducting material and extending substantially over one plane;
    wherein the base is positioned between the heating plates;
    wherein the heating plates are connected to each other by means of spacers external to the lateral expansion of the base; and wherein the entire base can move freely at least in one dimension relative to the heating plates such that a different, thermally-determined expansion of the heating plates on the one hand, and of the base on the other, is possible.

12. A heating element according to one of the claims 1 through 3, wherein the heating plate has a thickness of at most 2 mm.

13. A heating element according to one of the claims 1 through 3, wherein a seal between at a minimum one heating plate and the base is circumferentially located at the most exterior edge area of the heating element.

14. A heating element according to one of the claims 1 through 3, wherein the minimally one heating plate is made of a metal or a heat-conducting synthetic or a combination of the two.

15. A heating element according to one of the claims 1 through 3, wherein the base is made of a synthetic material.

* * * * *